United States Patent [19]

Slack

[11] Patent Number: 5,789,497
[45] Date of Patent: Aug. 4, 1998

[54] HEXAMETHYLENE DIISOCYANATE RESIDUE-BASED COMPOSITIONS AS FILLERS FOR POLYETHER POLYOLS

[75] Inventor: William E. Slack, Moundsville, W. Va.

[73] Assignee: Bayer Corporation, Pittsburgh, Pa.

[21] Appl. No.: 777,318

[22] Filed: Dec. 27, 1996

[51] Int. Cl.$^6$ .................................................. C08L 75/08
[52] U.S. Cl. .......................... 525/458; 525/460; 528/59; 528/66; 528/67; 528/76
[58] Field of Search ................................ 525/458, 460; 528/59, 66, 67, 76

[56] References Cited

U.S. PATENT DOCUMENTS 3,935,132  1/1976  Gerkin ........................ 525/458
5,473,044  12/1995  Mafoti ......................... 528/67

*Primary Examiner*—Patricia A. Short
*Attorney, Agent, or Firm*—Joseph C. Gil; Lyndanne M. Whalen

[57] ABSTRACT

Urethane-filled, polyether polyols are prepared by reacting (1) a hexamethylene diisocyanate residue from the phosgenation of hexamethylene diamine with contains less than 10% by weight monomeric hexamethylene diisocyanate and has a total isocyanate group content of at least 25% with (2) an alcohol containing at least four ether linkages in amounts such that the equivalent ratio of isocyanate groups in (1) to hydroxyl groups in (2) is from about 0.9:1.0 to about 1.0:0.9 and subsequently dissolving this reaction product in a polyether polyol.

9 Claims, No Drawings

HEXAMETHYLENE DIISOCYANATE RESIDUE-BASED COMPOSITIONS AS FILLERS FOR POLYETHER POLYOLS

BACKGROUND OF THE INVENTION

The present invention relates to a hexamethylene diisocyanate ("HDI") residue-filled polyether polyol, to a process for the production of a polyether polyol filled with an HDI residue-based urethane, to polyurethane prepolymers produced from these urethane filled polyether polyols and to polyurethanes produced from polyether polyols filled with HDI residue-based urethanes.

HDI is generally produced by phosgenating hexamethylene diamine ("HDA"). In the course of producing HDI by this process, a non-distillable by-product which is commonly referred to as "HDI residue" or "HDI bottoms" is generated. One of the major concerns in the production of HDI is, therefore, the amount of HDI residue generated and whether such HDI residue is useful in other applications.

It would therefore be advantageous to develop a method for converting HDI distillation residue to a urethane filler in which no HDI monomer remains. This urethane filler would be particularly advantageous if it could be dissolved in a polyether polyol to produce a clear liquid product useful for the production of polyurethanes.

SUMMARY OF THE INVENTION

It is an object of the present invention to provide a polyether polyol filled with an HDI residue-based urethane which is storage stable at ambient temperature.

It is also an object of the present invention to provide a method for producing a liquid HDI residue-based urethane filled polyether polyol.

It is another object of the present invention to provide a liquid, clear, urethane-filled polyether polyol which has been produced from HDI residue.

It is a further object of the present invention to provide a process for producing polyurethanes, particularly polyurethane foams, from a liquid, clear, urethane-filled polyether polyol that has been produced from HDI residue.

These and other objects which will be apparent to those skilled in the art are accomplished by selecting an HDI residue satisfying specific criteria. The HDI residue to be used in the present invention contains less than 10% by weight monomeric HDI and has a total NCO content (i.e., total NCO content of monomeric HDI plus any other isocyanate group containing material present in the residue) of at least 25%. HDI residue satisfying these criteria and an alcohol containing at least four ether linkages, preferably from 4 to 18 ether linkages, most preferably from 4 to 8 ether linkages are reacted in amounts such that the equivalent ratio of isocyanate groups to hydroxyl groups is from about 0.9:1.0 to about 1.0:0.9, preferably about 1:1. This reaction product is then dissolved in a polyether polyol to produce a urethane-filled polyether polyol. This urethane-filled polyether polyol may then be used to produce polyurethanes.

DETAILED DESCRIPTION OF THE INVENTION

The present invention relates to an HDI residue-based urethane filled polyether polyol, to a process for producing such polyether polyol, and to a process for the production of a polyurethane from such urethane-filled polyether polyol. The urethane filled polyether polyols of the present invention are made by reacting an alcohol containing at least four ether linkages, preferably from 4 to 18 ether linkages and most preferably from 4 to 8 ether linkages and an HDI residue satisfying specific criteria in amounts such that the equivalent ratio of isocyanate groups to hydroxyl groups is from about 0.9:1 to about 1:0.9, preferably about 1:1. This reaction product is then dissolved in a polyether polyol to produce a urethane-filled polyether polyol. This urethane-filled polyether polyol may then be reacted with an isocyanate to produce polyurethanes.

The HDI residues useful in the practice of the present invention must satisfy the following criteria: (1) the residue must have been generated by the phosgenation of hexamethylene diamine; (2) the monomeric HDI content of the HDI residue must be less than 10% by weight; and (3) the total isocyanate group content of the monomeric HDI plus any other isocyanate group containing material in the residue must be at least 25%.

The phosgenation of HDA may be carried out by any of the methods known to those skilled in the art. Upon completion of that phosgenation, monomeric HDI is generally removed from the reaction mixture by distillation. In accordance with the present invention, the reaction mixture may be distilled until the monomeric HDI content has been reduced to less than 10% by weight of the total weight of the residue, preferably less than 5% by weight monomeric HDI, and most preferably from about 1 to about 4% by weight monomeric HDI. The residue has a total NCO content (i.e., the total NCO content of monomeric HDI plus any other isocyanate group containing material in the residue) of at least 25%, preferably from about 25 to about 30%, most preferably from about 28 to about 30%, is suitable as a starting material for the process of the present invention. It is preferred, but not required, that any solvent employed in the phosgenation process be removed prior to use of the HDI residue in accordance with the present invention.

Any of the known monofunctional alcohols containing 4 or more ether linkages (i.e., compounds containing one alcoholic hydroxyl group and at least four ether linkages) may be reacted with an HDI residue satisfying the criteria of the present invention.

Examples of suitable monofunctional alcohols containing four or more ether linkages include those obtained in known manner by reacting one or more starting compounds containing an active hydrogen atom with one or more alkylene oxides such as ethylene oxide, propylene oxide, butylene oxide, styrene oxide, tetrahydrofuran, epichlorohydrin and mixtures of these alkylene oxides. Polyethers obtained by addition of ethylene oxide and/or propylene oxide are most preferred. Suitable starting compounds containing one reactive hydrogen atom include: 1-methoxy-2-propanol, diethylene glycol monobutylether, any of the isomers of butanol, any of the isomers of pentanol, and any of the other known carbon backbone alcohols.

The monofunctional alcohols containing four or more ether linkages which are useful in the practice of the present invention generally have a molecular weight (number average determined by end group analysis) of from about 200 to about 1100, preferably from about 200 to about 400. Suitable alcohols may also contain groups such as chlorine, bromine, tertiary amine groups and other groups which are not reactive with respect to isocyanate groups. Mixtures of such alcohols may also be used.

In addition to the monofunctional alcohol containing at least four ether groups, alcohols containing less than 4 ether groups or no ether groups at all and polyhydroxyl compounds such as diols and polyether polyols may also be reacted with the HDI residue to form urethane groups. However, any polyhydroxyl compounds and alcohols containing less than four ether groups should not be used in an amount such that they represent more than 20% of the total number of hydroxyl groups to be reacted with the HDI residue to form the urethane filler.

Polyether polyols useful in the practice of the present invention both for preparing the HDI urethane-capped residue and dissolving the HDI urethane-capped residue, typically have hydroxyl functionalities of from about 2 to about 6, preferably from about 2 to about 3, and molecular weights (number average determined by end group analysis) of from about 400 to about 6,000, preferably from about 500 to about 2,000 and at least 4, preferably from about 9 to about 130 ether linkages. Examples of such polyether polyols include those obtained in known manner by reacting one or more starting compounds which contain at least one reactive hydrogen atom with an alkylene oxide such as ethylene oxide, propylene oxide, butylene oxide, styrene oxide, tetrahydrofuran, epichlorohydrin and mixtures of these alkylene oxides. Polyethers obtained by the addition of ethylene oxide and/or propylene oxide are most preferred. Suitable starting compounds containing reactive hydrogen atoms include polyhydric alcohols such as ethylene glycol, 1,2- and 1,3-propylene glycol, 1,3- and 1,4-butylene glycol, 1,6-hexanediol, 1,8- octanediol, neopentyl glycol, cyclohexanedimethanol, (1,4-bis(hydroxy-methyl) cyclohexane), 2-methyl-1,3-propanediol, 2,2,4-trimethyl-1, 3-pentanediol, triethylene glycol, tetraethylene glycol, polyethylene glycol, dipropylene glycol, polypropylene glycol, dibutylene glycol and polybutylene glycol, glycerine and trimethylolpropane; water; methanol; ethanol; 1,2,6-hexane triol; 1,2,4-butane triol; trimethylol ethane; pentaerythritol; mannitol; sorbitol; methyl glycoside; sucrose; phenol; isononyl phenol; resorcinol; hydroquinone; and 1,1,1- or 1,1,2-tris-(hydroxylphenyl)-ethane.

Diols useful for producing HDI-based urethane filler in accordance with the present invention typically have hydroxyl functionalities of from about 2 to about 3. Diols described above as being useful starting compounds for the preparation of polyethers are examples of suitable diols.

The HDI residue satisfying the criteria of the present invention, an alcohol containing at least four ether linkages and any optional polyol are reacted in amounts such that the equivalent ratio of isocyanate groups to hydroxyl groups is from about 0.9:1 to about 1:0.9, preferably about 1:1. This reaction may be carried out at temperatures of from about 30° to about 120° C., preferably from about 60° to about 90° C., at ambient pressure.

The reaction product is a urethane group containing HDI residue-based composition which is soluble in most of the commonly used organic solvents (e.g., toluene, methylene chloride and tetrahydrofuran) and in polyether polyols at ambient temperature. This reaction product may then be dissolved in a polyether polyol to produce an HDI residue based urethane-filled polyether.

The amount of polyether in which the urethane group containing HDI residue is dissolved is generally determined on the basis of handling and processing considerations (e.g., viscosity). For most applications, however, the amount of polyether polyol used is selected so that the dissolved urethane-group containing HDI residue will be present in a quantity of from about 10 to about 50% by weight of the solution.

The urethane filled polyethers of the present invention are characterized by their clarity and low viscosity when compared to other filled polyethers.

The urethane filled polyethers of the present invention may be used to produce polyurethanes by reacting them with any of the known isocyanates. These filled polyethers are preferably reacted with polyisocyanates having functionalities of from about 2 to about 4 and molecular weights of from about 100 to about 400 in amounts such that the NCO/OH ratio is from about 0.8 to about 1.2 to produce polyurethanes.

The preferred polyisocyanates include toluene diisocyanate, diphenylmethane diisocyanate and polyphenyl polymethylene polyisocyanate.

Catalysts, blowing agents and solvents may be used to aid the polyurethane-forming reaction. Examples of catalysts useful for promoting urethane reactions include di-n-butyl tin dichloride, di-n-butyl tin diacetate, di-n-butyl tin dilaurate, triethylenediamine, bismuth nitrate. Examples of suitable blowing agents include methylene chloride and carbon dioxide. Examples of the useful solvents include toluene, tetrahydrofuran, and chlorobenzene.

Having thus described my invention, the following Examples are given as being illustrative thereof. All parts and percentages given in these Examples are parts by weight and percentages by weight, unless otherwise indicated.

EXAMPLES

The materials used in the Examples which follow were:

ALCOHOL A: diethylene glycol monobutyl ether having 1 ether group.

ALCOHOL B: 1-methoxy-2-propanol having one (1) ether group.

ALCOHOL C: 1-butanol having no ether groups.

ALCOHOL D: a 1-butanol started propylene oxide adduct having a molecular weight of 315, a hydroxyl functionality of 1 and 4 ether linkages.

POLYETHER A: a propylene glycol/propylene oxide/ ethylene oxide adduct with the ethylene oxide present as 20% by weight termination having a molecular weight of 4,000 and a hydroxyl functionality of approximately 2.

POLYETHER B: a propylene glycol/propylene oxide adduct having a molecular weight of 2,000 and a functionality of approximately 2.

POLYETHER C: a glycerine/propylene oxide/ethylene oxide adduct with the ethylene oxide present as 17% by weight termination having a molecular weight of 4800 and a functionality of approximately 3.

POLYETHER D: a glycerine/propylene glycol/propylene oxide/ethylene oxide adduct with the ethylene oxide present as 10% internal block having a molecular weight of 2860 and a functionality of approximately 2.9.

HDI RESIDUE: residue generated by phosgenation of HDA (hexamethylene diamine) which contains 3.5% monomeric HDI and has a total NCO content of 28.3% by weight.

The procedure used in each of the Examples was as follows:

HDI RESIDUE was introduced into a 1 liter 3-necked flask equipped with a stirrer and thermometer in the amount indicated in the Table. The HDI RESIDUE was stirred and to this stirred HDI RESIDUE was added the amount of alcohol and any optional polyol at 25° C. in the amount(s) indicated in the Table. The resultant mixture was heated to 90° C. and then held at 90° C. until no NCO groups remained. The contents of the flask were then dissolved in the amount of POLYETHER necessary to obtain a product having the capped urethane residue content indicated in the Table.

TABLE

| EX. | HDI Residue (gms) | Alc. | gms Alcohol | Polyether | gms. Polyether | % Urethane filler | Appearance | Visc. mPa · s |
|---|---|---|---|---|---|---|---|---|
| 1 | 59.0 | D | 125 | A | 736 | 20 | clear | 934 |
| 2 | 59.0 | D | 125 | C | 736 | 20 | clear | 1024 |
| 3 | 59.0 | D | 125 | D | 736 | 20 | clear | 522 |
| 4* | 62.4 | C | 31.3 | C | 291 | 24.4 | turbid with solids | — |
| 5* | 100 | B | 60.6 | C | 643 | 20 | turbid with tar | — |
| 6* | 100 | A | 109 | C | 627 | 25 | turbid | — |
| 7* | 100 | A | 109 | A | 627 | 25 | turbid | — |
| 8* | 100 | A | 109 | D | 627 | 25 | turbid with solids | — |
| 9* | 100 | A | 109 | B | 627 | 25 | turbid with solids | — |

*Comparative

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a urethane-filled, polyether polyol comprising
   a) reacting
      1) a hexamethylene diisocyanate residue from the phosgenation of hexamethylene diamine which contains less than 10% by weight monomeric hexamethylene diisocyanate and has a total isocyanate group content of at least 25% with
      2) an alcohol containing at least four ether linkages in amounts such that the equivalent ratio of isocyanate groups in 1) to hydroxyl groups is from about 0.9:1.0 to about 1.0:0.9 and
   b) dissolving the product of a) in a polyether polyol.

2. The process of claim 1 in which a hydroxyl compound that contains less than four ether groups is present during the reaction in an amount such that at least 80% of the total hydroxyl groups present are hydroxyl groups from the alcohol containing at least four ether linkages.

3. The process of claim 1 in which the alcohol having at least four ether linkages has a functionality of about one and a molecular weight of from about 200 to about 400.

4. The clear, low viscosity, urethane-filled polyether polyol produced by the process of claim 3.

5. The process of claim 1 in which the hexamethylene diisocyanate residue has a total isocyanate group content of at least 28%.

6. The clear, low viscosity, urethane-filled polyether polyol produced by the process of claim 5.

7. The process of claim 1 in which the hexamethylene diisocyanate residue has a monomeric hexamethylene diisocyanate content of less than 5%.

8. The clear, low viscosity, urethane-filled polyether polyol produced by the process of claim 1.

9. A polyurethane produced by reacting the urethane-filled polyether polyol of claim 8 with an isocyanate compound in an amount such that the NCO/OH ratio is from about 0.8 to about 1.2.

* * * * *